W. H. CORNELL.
THILL-COUPLING.
No. 174,413. Patented March 7, 1876.
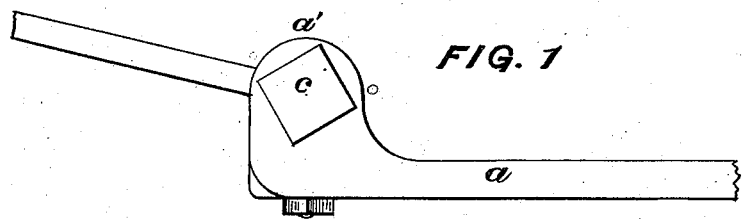
FIG. 1
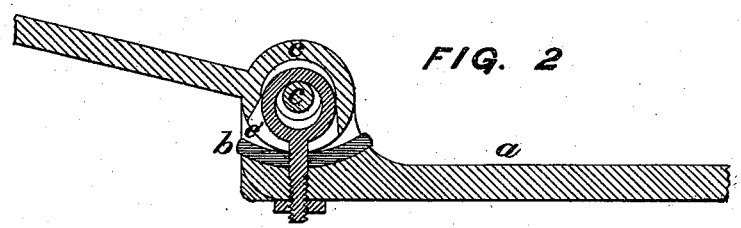
FIG. 2
FIG. 3.
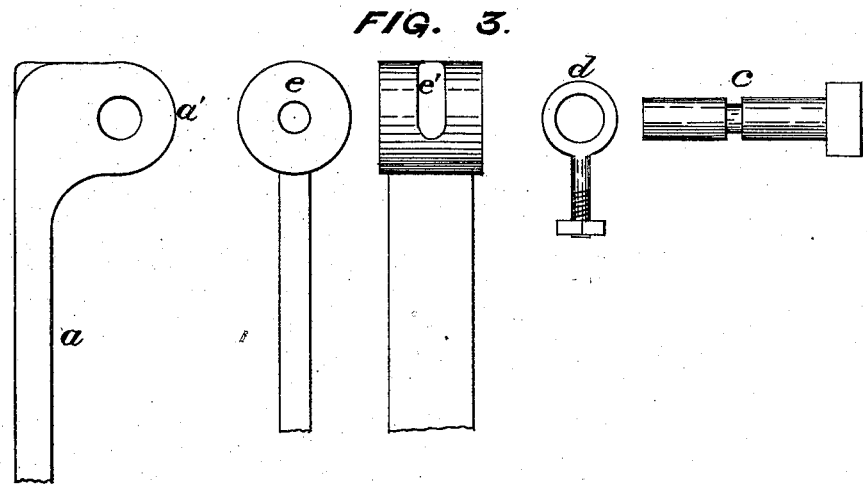
Witnesses
Inventor
Walter H. Cornell
by J. J. Greenough Atty

UNITED STATES PATENT OFFICE.

WALTER H. CORNELL, OF SKANEATELES, NEW YORK.

IMPROVEMENT IN THILL-COUPLINGS.

Specification forming part of Letters Patent No. 174,413, dated March 7, 1876; application filed January 26, 1876.

*To all whom it may concern:*

Be it known that I, WALTER H. CORNELL, of Skaneateles, Onondaga county, State of New York, have invented a new and Improved Fill-Coupling, of which the following is a specification:

This invention is for the purpose of securing and tightening the joint and pin coupling the fill, &c., to the carriage, to prevent all noise and jarring as the joint wears.

The construction is as follows, referring to the accompanying drawing, in which—

Figure 1 is a side elevation. Fig. 2 is a sectional elevation parallel to Fig. 1; Fig. 3, the parts detached.

The same references are used in all the figures.

$a$ is that part of the joint affixed to, or connected with, the front axle of a carriage. It is a flat plate, $a$, with two lugs, $a'$, projecting up from it parallel with each other at the front end, and between these a piece of india-rubber is placed upon the plate under the joint. The lugs $a'$ have holes horizontally through them, through which the joint-pin $c$ passes. This joint-pin $c$ (shown detached in Fig. 3) has a head on one end, and may have a screw and nut on the other; but I do not deem it necessary, and consequently have not shown it in the drawing. At the center of the pin $c$ I form a groove, if I wish, thereby to secure it from being drawn out, in which groove an eye of bolt $d$ fits, the shank of which extends down through a hole in the plate $a$, with a screw-nut on it, by which the eye is drawn down into the joint-pin $c$. The shank of that part of the joint attached to the shaft or pole has an eye, $e$, on it that just fits between the lugs $a'$, and through this eye the pin $c$ passes. There is a slot, $e'$, on the under side of the eye at the center of its breadth, through which the bolt $d$ passes. The eye $e$ of the joint is drawn down onto the rubber $b$ by the bolt $d$ sufficiently tight to hold all the parts from jarring and making a noise, while at the same time it can be made to hold the pin $c$ in place.

Having thus fully described my improved coupling, what I claim as new is—

The combination of the joint-pin $c$, bolt $d$, and slotted eye $e$, substantially as and for the purposes herein set forth.

WALTER H. CORNELL.

Witnesses:
GEORGE VAN DYKE,
EDWARD HORNE.